United States Patent
Yeo

(10) Patent No.: US 7,850,571 B2
(45) Date of Patent: Dec. 14, 2010

(54) METHOD AND APPARATUS FOR CONTROLLING A LINE PRESSURE OF AN AUTOMATIC TRANSMISSION

(75) Inventor: Changgi Yeo, Gunpo (KR)

(73) Assignee: Hyundai Motor Company, Seoul (KR)

( * ) Notice: Subject to any disclaimer, the term of this patent is extended or adjusted under 35 U.S.C. 154(b) by 404 days.

(21) Appl. No.: 11/951,504

(22) Filed: Dec. 6, 2007

(65) Prior Publication Data

US 2009/0105045 A1 Apr. 23, 2009

(30) Foreign Application Priority Data

Oct. 19, 2007 (KR) .................... 10-2007-0105553

(51) Int. Cl.
*B60W 10/00* (2006.01)
(52) U.S. Cl. ........................ 477/83; 477/144
(58) Field of Classification Search .................. 477/53, 477/63, 74, 83, 144, 146
See application file for complete search history.

(56) References Cited

U.S. PATENT DOCUMENTS 5,792,021 A * 8/1998 Minowa et al. ............. 477/106
5,810,692 A * 9/1998 Takiguchi et al. ........... 477/144
5,842,951 A * 12/1998 Yasue et al. ................. 477/149

FOREIGN PATENT DOCUMENTS

| JP | 05-312261 | 11/1993 |
|----|-----------|---------|
| JP | 2002-295663 | 10/2002 |
| KR | 10-1999-0053662 A | 7/1999 |
| KR | 10-1999-0053664 A | 7/1999 |

* cited by examiner

*Primary Examiner*—David D Le
*Assistant Examiner*—Justin Holmes
(74) *Attorney, Agent, or Firm*—Morgan, Lewis & Bockius LLP

(57) ABSTRACT

An apparatus and method for controlling line pressure of an automatic transmission. A driving information detection unit obtains information. A shift control unit determines if a power-on downshift is requested based on the information of the driving information detection unit, and controls the line pressure based on if the power-on downshift is requested. An actuator forms the line pressure according to a control signal of the shift control unit. A pressure supply control unit controls supply of the line pressure to on-coming and off-going frictional elements of the transmission. The method outputs a first value of a line pressure control duty if the power-on downshift is requested; subsequently outputs a second, lower value of the line pressure control duty if a first shifting is started during outputting of the first value; and subsequently outputs the first value if a turbine speed is greater than or equal to a predetermined speed.

3 Claims, 2 Drawing Sheets

METHOD AND APPARATUS FOR CONTROLLING A LINE PRESSURE OF AN AUTOMATIC TRANSMISSION

CROSS-REFERENCE TO RELATED APPLICATION

This application claims priority to, and the benefit of, Korean Patent Application No. 10-2007-0105553, filed in the Korean intellectual Property Office on Oct. 19, 2007, the entire contents of which are incorporated herein by reference.

BACKGROUND OF THE INVENTION

1. Field of the Invention

The present invention relates to a method and an apparatus for controlling a line pressure of an automatic transmission.

2. Description of the Related Art

A typical shift control apparatus of an automatic transmission controls hydraulic pressure of solenoid valves depending on inputs such as vehicle speed and throttle valve opening.

The automatic transmission includes a number of frictional elements. To shift, an off-going element is released, and an on-coming element is engaged. The operation of the off-going and on-coming elements is controlled by hydraulic pressure supplied thereto.

Typically, full line pressure is formed, and then the full line pressure is maintained until a final target shift-speed is engaged. Such a scheme may result in excessive pressure supply to the off-going element, delaying the release of the hydraulic pressure from the off-going element.

The above information disclosed in this Background section is only for enhancement of understanding of the background of the invention and therefore it may contain information that does not form the prior art that is already known in this country to a person of ordinary skill in the art.

SUMMARY OF THE INVENTION

An apparatus for controlling a line pressure of an automatic transmission includes a driving information detection unit that obtains information; a shift control unit that determines if a power-on downshift is requested based on the information of the driving information detection unit, and controls the line pressure based on if the power-on downshift is requested; an actuator that forms the line pressure according to a control signal of the shift control unit; and a pressure supply control unit that controls a supply of the line pressure to on-coming and off-going frictional elements of the transmission.

The driving information detection unit may include an engine speed detector, a throttle opening detector, a shift-speed detector, a turbine speed detector, and an accelerator pedal position detector.

The control unit may output a first value of a line pressure control duty if the power-on downshift is requested; subsequently output a second, lower value of the line pressure control duty if a first shifting is started during the outputting of the first value; and subsequently output the first value if a turbine speed is greater than or equal to a predetermined speed.

DETAILED DESCRIPTION OF PREFERRED EMBODIMENTS

Figure 1:
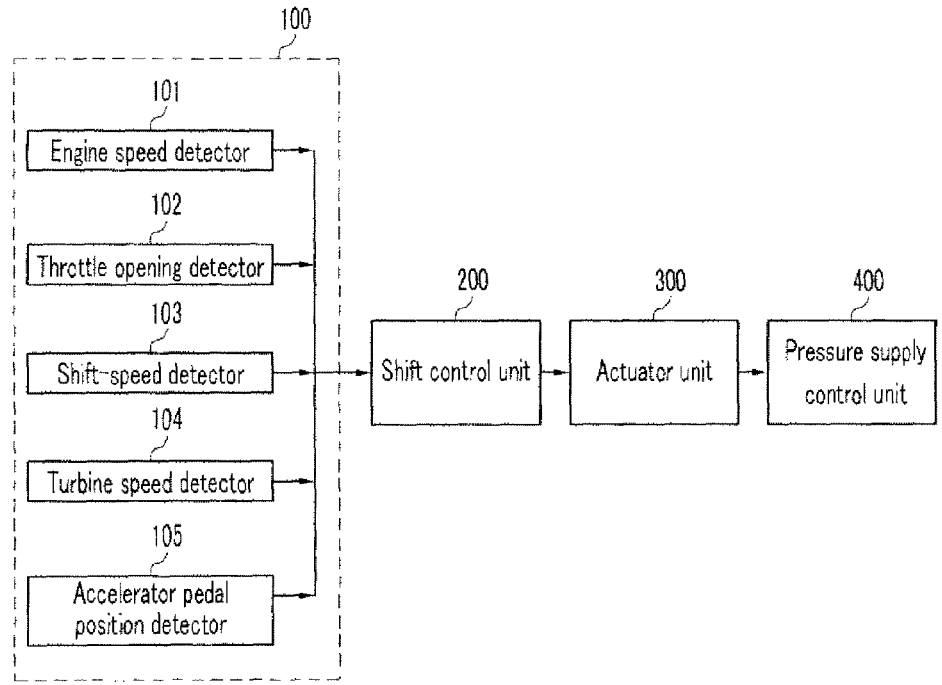
FIG. 1 is a block diagram that shows an apparatus for controlling a line pressure of an automatic transmission according to an exemplary embodiment of the present invention.

Referring to FIG. 1, an apparatus according to an exemplary embodiment of the present invention includes a driving information detection unit 100, a shift control unit 200, actuator unit 300, and a pressure supply control unit 400.

The driving information detection unit 100 supplies necessary information to the shift control unit 200, and may include an engine speed detector 101, a throttle opening detector 102, a shift-speed detector 103, a turbine speed detector 104, and an accelerator pedal position detector 105.

The engine speed detector 101, which may be a crank position sensor or a cam angle sensor (CAS), detects the engine speed. The throttle opening detector 102 detects an opening of a throttle valve that controls the amount of air drawn to a combustion chamber. The shift-speed detector 103 detects a currently engaged shift-speed. The turbine speed detector 104 detects rotational speed of a turbine. The accelerator pedal position detector 105 detects a position of the accelerator pedal. The information from the sensors is sent to the shift control unit 200.

The shift control unit 200 determines whether a power-on downshift request occurs, based on the information from the driving information detection unit 100. If the power-on downshift request has occurred, the shift control unit 200 determines a target shift-speed, and controls the line pressure for operating on-coming and off-going elements to attain the target shift-speed.

For example, if the shift control unit 200 detects a power-on downshift request to second or third speed while the vehicle is running in fifth speed, the shift control unit 200 determines a line pressure for operating the on-coming and off-going elements of the primary and secondary shift portions, and then controls the actuator unit 300 so as to control the pressure supply control unit 400.

Figure 3:
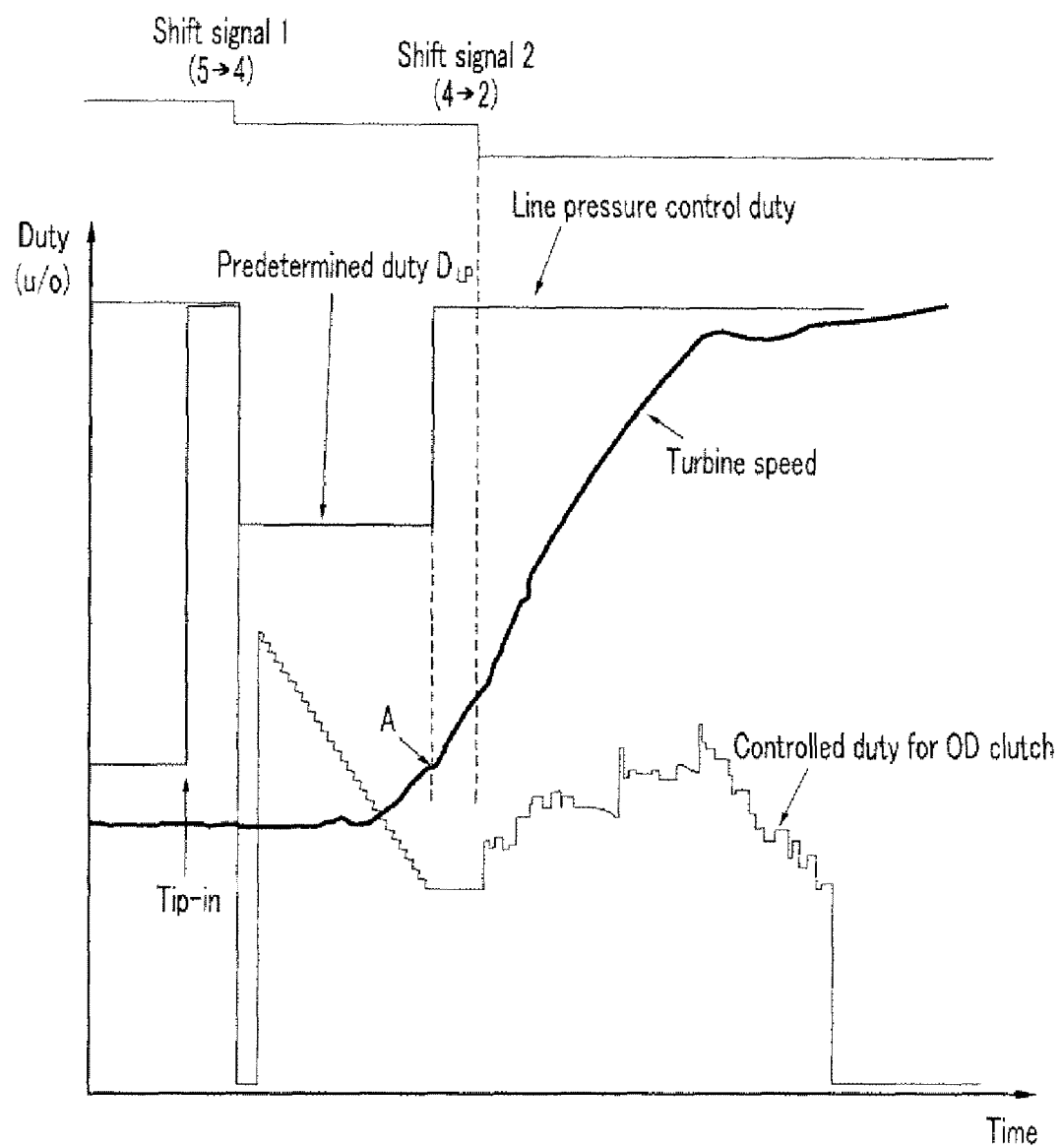
FIG. 3 shows a line pressure control duty according to an exemplary embodiment of the present invention.

Referring to FIG. 3, in response to the power-on downshift request, the shift control unit 200 immediately outputs a full value of the line pressure control duty. Then, the shift control unit 200 reduces the line pressure control duty to a predetermined level $D_{LP}$ (e.g., 50% of the full line pressure control duty) when an initial shifting of 5→4 shifting is detected. By such a reduction off the line pressure control duty, the line pressure is reduced and the off-going element of, e.g., the primary shift portion, may be quickly released.

When a turbine speed increases due to finishing of the initial shifting (i.e., the 5→4 shifting), the shift control unit increases the line pressure control duty to the full value such that the off-going and on-coming elements may be quickly released and engaged.

The time "A" at which the line pressure control duty is raised back to 100% occurs when a second shifting (e.g., 4→3 shifting or 4→2 shifting) to a final target shift-speed of the power-on downshift is detected. That is, time A occurs when $N_t \geq (C_{LP})(N_o)$, where $N_t$ denotes the turbine speed, $N_o$ denotes an output speed of the transmission, and $C_{LP}$ denotes a dimensionless coefficient depending on the final target shift-speed.

The actuator unit 300 forms the line pressure for operation of the on-coming and off-going elements of the primary and secondary shift portions, according to a control signal of the shift control unit 200.

The pressure supply control unit 400 controls the supply of hydraulic pressure from the line pressure to the on-coming and off-going elements.

Figure 2:
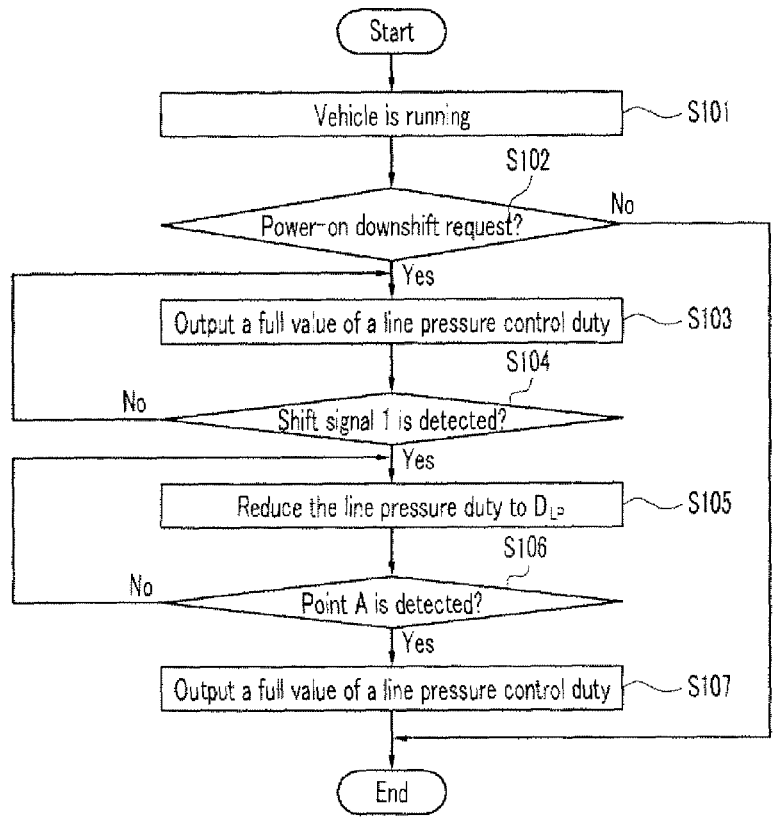
FIG. 2 is a flowchart that shows a method for controlling a line pressure of an automatic transmission according to an exemplary embodiment of the present invention.

Hereinafter, a method for controlling a line pressure of an automatic transmission according to an exemplary embodiment of the present invention is described in detail with reference to FIG. 2 and FIG. 3.

The vehicle is initially running at a shift-speed, e.g., the fifth speed at step S101. In this case, the shift control unit 200 determines at step S102 whether the power-on downshift has occurred, on the basis of the information from the driving information detection unit 100.

If a shift request has not occurred at the step S102, the shift control unit 200 maintains the current shift speed.

If a power-on downshift request is detected, the shift control unit 200 determines a final target shift-speed at step S103, and the shift control unit 200 outputs a full value 100% of a line pressure control duty so as to form a lull line pressure for operating the on-coming and off-going elements of the primary and secondary shift portions, thereby operating the pressure supply control unit 400 through the actuator unit 300.

Subsequently at step S104, the shift control unit 200 determines whether the initial shifting is detected from the shift-speed detector 103. When the initial shifting is detected, the shift control unit 200 reduces the line pressure control duty to $D_{LP}$ at step S105 such that the off-going element is quickly released.

While the pressure of the off-going element is released, the shift control unit 200 determines at step S106 whether the turbine speed increases due to finishing of the initial shifting step (i.e., whether the time point A has been achieved).

If the increase of the turbine speed is not detected, the shift control unit 200 maintains the line pressure control duty at $D_{LP}$. If the increase of the turbine speed is detected, the shift control unit 200 immediately increases the line pressure control duty to the frill value such that the off-going and on-coming elements may be quickly released and engaged at step S107.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling a line pressure of an automatic transmission, the apparatus comprising:
    a driving information detection unit that obtains information;
    a shift control unit that determines if a power-on downshift is requested based on the information of the driving information detection unit, and controls the line pressure based on if the power-on downshift is requested;
    an actuator that forms the line pressure according to a control signal of the shift control unit; and
    a pressure supply control unit that controls a supply of the line pressure to on-coming and off-going frictional elements of the transmission; and
    wherein the shift control unit performs:
        outputting a full value of a line pressure control duty so as to form a full line pressure when the power-on downshift request is detected;
        reducing the line pressure control duty to a predetermined level when a first shifting is started during the outputting of the full value; and
        increasing the line pressure control duty to the full value when an increase of a turbine speed is detected due to a finishing of the first shifting;
    wherein time in which the increase of the turbine speed is detected due to the finishing of the first shifting is when $N_t \geq (C_{LP})(N_o)$, where $N_t$ is the turbine speed, $N_o$ is an output speed of the transmission, and $C_{LP}$ is a dimensionless coefficient depending on a final target shift-speed.

2. The apparatus of claim 1, wherein the driving information detection unit comprises:
    an engine speed detector detecting an engine speed;
    a throttle opening detector that detects a throttle valve opening;
    a shift-speed detector that detects a currently engaged shift-speed;
    a turbine speed detector that detects a speed of a turbine; and
    an accelerator pedal position detector that detects a position of an accelerator pedal.

3. A method of controlling a line pressure of an automatic transmission, comprising:
    outputting a full value of a line pressure control duty so as to form a full line pressure when a power-on downshift request is detected;
    reducing the line pressure control duty to a predetermined level when a first shifting is started during the outputting of the full value; and
    increasing the line pressure control duty to the full value when an increase of a turbine speed is detected due to a finishing of the first shifting;
    wherein time in which the increase of the turbine speed is detected due to the finishing of the first shifting is when $N_t \geq (C_{LP})(N_o)$, where $N_t$ is the turbine speed, $N_o$ is an output speed of the transmission, and $C_{LP}$ is a dimensionless coefficient depending on a final target shift-speed.

* * * * *